A. P. BROOKE.
Machine for Pressing and Molding Glass.

No. 162,894.  Patented May 4, 1875.

Witnesses
Chas. Wahlers.
Otto Hufeland.

Inventor.
Aries P. Brooke
by
Van Santvoord & Hauff
Attys

UNITED STATES PATENT OFFICE.

ARIES P. BROOKE, OF BAYONNE, NEW JERSEY, ASSIGNOR TO JAMES M. BROOKFIELD, OF NEW YORK, N. Y.

IMPROVEMENT IN MACHINES FOR PRESSING AND MOLDING GLASS.

Specification forming part of Letters Patent No. 162,894, dated May 4, 1875; application filed April 13, 1875.

*To all whom it may concern:*

Figure 1:
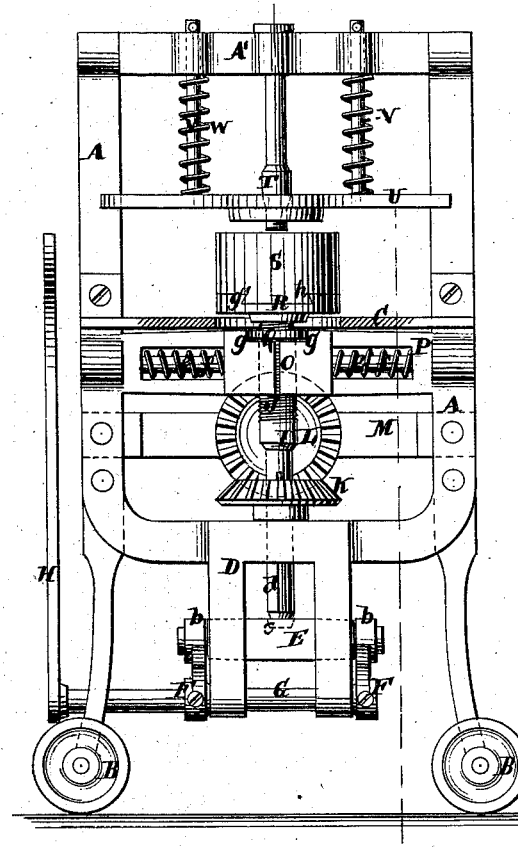
Figure 2:
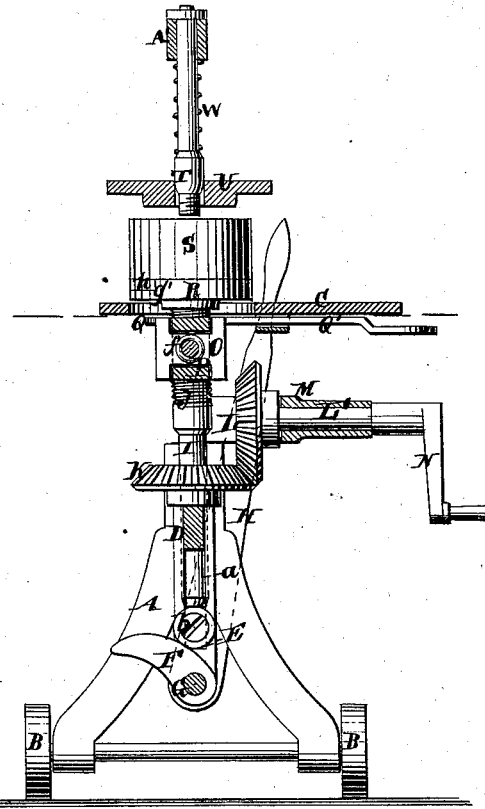
Figure 3:
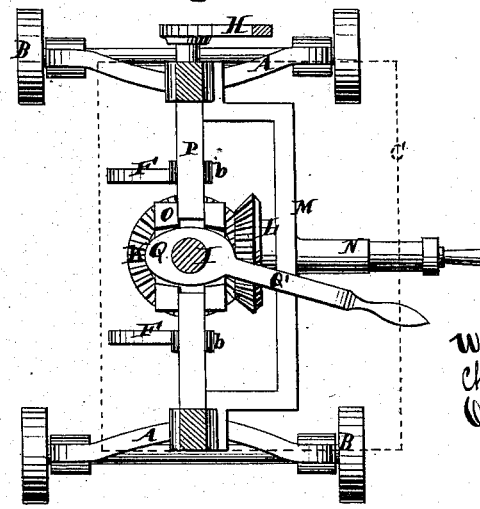

Be it known that I, ARIES P. BROOKE, of Bayonne, in the county of Hudson and State of New Jersey, have invented a certain new and useful Improvement in Machines for Pressing and Molding Glass and other Materials, of which the following is a specification:

This invention is illustrated in the accompanying drawing, in which Figure 1 represents a side elevation, partly in section. Fig. 2 is a vertical section in the plane of the line $x\ x$, Fig. 1. Fig. 3 is a horizontal section in the plane of the line $y\ y$, Fig. 2.

Similar letters indicate corresponding parts.

This invention relates particularly to machines for pressing and forming screw glass insulators; and consists in the combination of a mold and a plain or screw-threaded former with a lifting apparatus, adapted to lift the mold, in order to subject its contents to the action of the former, with a screw-spindle, which forms the support of the mold, and is adapted to lower it by a revolving motion, and with a divided nut, whereby the screw-spindle may be brought in or out of action. The former is connected to a cross-piece of the frame-work of my machine, and it is surrounded by a plate, also connected to the cross-piece, and which is subjected to the action of springs, in such a manner that the plate forms an elastic stop to the mold when it is lifted, in order to subject its contents to the action of the former. The lifting apparatus is constructed of a cross-head, which forms the step of the screw-spindle, and which slides up and down in a slotted frame-piece of the machine, in combination with cams which are mounted on a rock-shaft carrying a hand-lever, in such a manner that, by moving the lever in the proper directions, a rising and falling motion may be imparted to the cross-head, and through it to the spindle and to the mold. The mold in my machine is connected to a supporting-plate, affixed to the top of the screw-spindle by means of a mortise and tenon, whereby the mold is rendered detachable, while it partakes of the motion of the spindle. With the screw-spindle is combined driving-gear of such a nature that it admits of lifting the spindle, while it is adapted to impart to it a revolving motion.

The spindle is embraced by a screw-nut, divided into two or more parts, which may be brought together or separated from each other, and when the parts are brought together and the spindle is turned in the proper direction, it becomes lowered by the action of its screw-thread, while, when the parts are separated, the nut admits the lifting of the spindle. With the divided nut is combined an eccentric, having a suitable handle, whereby its parts may be moved away from each other; and with the nut are combined, furthermore, springs, which have a tendency to keep the parts together.

In the drawing, the letter A designates the frame-work of my machine, which is mounted on wheels B, so that it can be readily moved from place to place, and which is made with a table, C. On this frame A is formed a depending piece, D, which has a slot, $a$, Fig. 2, in which is fitted the cross-head E. This cross-head has affixed to its respective ends anti-friction rolls $b$, through the medium of which it is subjected to the action of cams F, which are mounted on a rock-shaft, G, having its bearings in the frame-piece D. To the outer end of the rock-shaft G is secured a hand-lever, H, which is, preferably, made of such length as to extend above the table C, and thus be brought within convenient reach of the workman.

When this lever H is moved in one direction, the cams F are caused to displace the cross-head E and to move the same upward in the slotted frame-piece D, while, when the lever is moved in another direction, the cams are brought out of contact with the cross-head, and the same falls by its inherent gravity.

The cross-head E is provided with a socket, $c$, (see Fig. 1,) and forms the step of a spindle, I, which is provided with a screw-thread, J, on its upper part. This spindle I passes through the head of the frame-piece D, and is supported thereby when released from the nut, as hereinafter described. On the screw-spindle I is mounted a bevel-wheel, K, which rests on the head of the frame-piece D, and is engaged by a similar wheel, L, whose shaft L' has its bearing in a bracket, M, secured to the main frame A. This shaft L' is provided with a hand-crank, N, by turning which a revolving motion is imparted to the screw-spindle. The bevel-wheel K is connected to the spindle I by means of a feather-key, $d$, Fig. 1. The letter O designates a divided or combination nut, the parts of which embrace the threaded portion of the spindle I, and which are arranged to slide on a cross-piece, P, of the frame A. From the said parts of the nut O project rods $e$, which are fastened to the nut and pass loosely through the sides of the frame. On the rods $e$ are arranged springs $f$, which exert their action on the parts of the nut O, and have a tendency to keep the parts together— or, in other words, to contract the same on the spindle. The upper part of the nut O is provided with shoulders $g$, between which is placed an eccentric, Q, which turns on the spindle I, and is made with a handle, Q'.

When the cam Q is turned out of the position it occupies in Fig. 3 of the drawing, the parts of the nut O are separated or moved away from each other against the action of the springs, so as to release the spindle, while, when the cam is returned to the position shown, the parts are caused to come together by the action of the springs.

The upper end of the spindle I carries a plate, R, which forms the support of the mold S. This supporting-plate R is provided with a mortise, $g'$, while on the bottom of the mold is formed a tenon, $h$. The mortise and tenon may be dovetailed, and by means thereof a firm connection of the mold with the plate is obtained, so that the mold partakes of the movement of the spindle, while it is capable of detachment. To the top cross-piece A' of the main frame A is connected the shank of a former, T, which is provided with a screw-thread, and which passes through a plate, U, connected to the cross-piece. The plate U is connected to the cross-piece A' by means of guide-rods V, which are fastened to the plate and pass loosely through the cross-piece, while between the cross-piece and plate are interposed springs W.

I will now proceed to describe the operation of my machine. I commence by filling the mold S with molten glass, or other material which is to be pressed and molded, either before or after the mold has been adjusted on its supporting-plate R. I then release the spindle from the nut O by means herein stated, and lift the mold by the lifting apparatus till its top part comes in contact with the plate U and displaces the plate. The mold is thus stopped by the action of the springs W on the plate U, and I am enabled to determine the position of the former T, which has, by this time, entered the mold. The former having entered the mold or the material contained therein to a sufficient depth, I contract the nut O and proceed to work the driving-gear of the spindle, whereby a revolving and a gradually-descending motion is imparted to the spindle and to the mold, and by this means a screw-thread is formed in the glass.

It may be remarked, instead of, or in addition to, the turning of the mold, that the former T may be so arranged that it is capable of a revolving motion, so as to turn it out of the mold, in which case the mold would remain stationary after it had been lifted up to its higher position.

What I claim as new, and desire to secure by Letters Patent, is—

1. In a machine for pressing and molding glass and other materials, the combination of the former T and mold S with a lifting apparatus adapted to lift the mold, screw-spindle I, which forms the support of the mold, and with a divided nut, O, substantially as described.

2. In combination with the former T and mold S, a lifting apparatus constructed of the spindle I, cross-head E, slotted frame-piece D, cams F, rock-shaft G, and lever H, substantially as described.

3. In combination with the former T and mold S, the screw-spindle I, carrying and adapted to support the mold, and the divided nut O, substantially as described.

4. The combination, with the screw-spindle I and divided nut O, of the eccentric Q, substantially as and for the purpose described.

5. In combination with the divided nut O and eccentric Q, the rods $e$ and springs $f$, substantially as described.

In testimony that I claim the foregoing, I have hereunto set my hand and seal this 31st day of March, 1875.

ARIES P. BROOKE. [L. S.]

Witnesses:
J. VAN SANTVOORD,
E. F. KASTENHUBER.